United States Patent [19]
Redman-White

[11] Patent Number: 4,738,138
[45] Date of Patent: Apr. 19, 1988

[54] MEASUREMENT OF WAVE PROPAGATION POWER FLOW IN STRUCTURES

[75] Inventor: William Redman-White, Southampton, England

[73] Assignee: Secretary of State for Defence in Her Majesty's Government of the United Kingdom of Great Britain and Northern Ireland, London, England

[21] Appl. No.: 916,491

[22] PCT Filed: Nov. 15, 1985

[86] PCT No.: PCT/GB85/00518
§ 371 Date: Aug. 22, 1986
§ 102(e) Date: Aug. 22, 1986

[87] PCT Pub. No.: WO86/03291
PCT Pub. Date: Jun. 5, 1986

[30] Foreign Application Priority Data
Nov. 20, 1984 [GB] United Kingdom ............... 8429309

[51] Int. Cl.⁴ .............................................. G01M 7/00
[52] U.S. Cl. ........................................ 73/594; 73/602
[58] Field of Search ................ 73/594, 602, 579, 786; 364/508, 566

[56] References Cited
U.S. PATENT DOCUMENTS
4,180,811 12/1979 Yoshimura et al. ............... 73/594 X
4,598,588 7/1986 Hanson .............................. 73/594 X OTHER PUBLICATIONS
Herbertz, J. Measurement of Ultrasonic Power . . . Horns, Ultrasonics, vol. 14, No. 6, 1976, pp. 278–280, Great Britain.

Primary Examiner—Jerry W. Myracle
Attorney, Agent, or Firm—William R. Hinds

[57] ABSTRACT

A vibration sensor for measuring the flow of vibrational energy through a structure comprises four accelerometers (24–27) placed in cruciform arrangement on the surface of the structure. The signals from the accelerometers are processed in pairs using sum/difference amplifiers (36–40) to give two rotational (41, 42) and one translational (43) acceleration signal. The acceleration signals are frequency modulated (46–48) by as local oscillator (53) of preselected frequency, low-pass filtered (62–64) and the rotational acceleration signals (68, 70) then multiplied (72, 73) in phase quadrature (54) with the translational acceleration signal (69). The DC components of the resulting signals (76) are proportional to the time-average vibrational power flow. Knowledge of the flow paths facilitates the design of the structure to minimize effects of unwanted vibrations.

17 Claims, 3 Drawing Sheets

MEASUREMENT OF WAVE PROPAGATION POWER FLOW IN STRUCTURES

The invention relates to apparatus and methods for measuring the power flow associated with wave propagation, particularly though not exclusively for measuring vibration power flow through structures.

In attempting to control vibration in structures it is desirable to identify dominant paths of vibration transmission from sources (eg machines) through the structure to some point of interest. Consideration of only the amplitudes of vibration in a structure is of little help as stationary waves may cause large local vibration amplitudes without a significant power transmission. It is therefore convenient to introduce a concept of structural wave intensity, defined as the power flow per unit width of cross-section, which is measurable as a vector quantity at any given point.

In structural elements such as beams, where wave propagation is in one dimension only, the power flow crossing the total cross-sectional area is considered. The mechanical power transmitted can be given simply by the instantaneous product of the force and the velocity at the point of action. By repeating the intensity measurements at many positions on a structure it should be possible to build up a pattern representing paths of significant power flow.

Previous investigations have indicated that flexural waves are the most significant type of motion in the transmission of power through structures. Hence, intensity measurements can be greatly influenced by physical factors such as the size, material and shape of the structural elements.

The four accelerometer finite difference method is suitable for measuring the one dimensional power flow in beams. The method attempts to achieve maximum generally of application by estimating both the bending moment and the shear force components of power flow in the base. Under ideal conditions the dynamic range of the four accelerometer finite difference method would be infinite, however instrumentation tolerances have a deleterious effect and even moderate values of tolerances produce quite significant measurement errors.

In any practical structure, particularly where reverberent conditions may be expected, any measurement errors will be almost completely dominated by spurious results generated by stationary waves. The ability of a measuring system to provide an accurate measurement of the travelling wave component in the presence of a possibly much larger standing wave is termed its dynamic range. The systems susceptibility to these errors is governed by the instrumentation phase tolerances either in the transducers, the signal conditioning amplifiers or in the signal processing.

As broadband examination of flexural wave intensity is not very meaningful existing narrow band systems use filters, such as band-pass or switched banks of filters over one octave or a third of an octave. However, the inventor has found that intensity patterns change rapidly with changing frequency and even a third of an octave is too broad. Phase matching of the filters is also crucial as it governs the dynamic range and hence the usefulness of the system. Thus for any of the prior art structural wave intensity measuring systems to be capable of making accurate measurements, very narrow bandwidth filters with very close phase matching between channels must be used. To a large extent these two requirements are conflicting since filters with a rapid increase of attenuation outside the passband imply a large number of singularities in their transfer functions. This in turn dictates that the phase shift around the cut-off and cut-on frequencies will be large, and hence the problem of obtaining accurate close phase matching becomes more acute. For the system to be useable over a range of frequencies it is necessary either to make these filers tunable or to use a bank of switched frequency filters. With tunable filters, however, satisfactory phase matching is virtually impossible while the use of a switched bank of filters increases the problems of construction and the maintenance of the same measurement bandwidth results in greater complexity for filters with high centre frequencies.

The object of this invention is to provide a system for measuring the vibration intensity at a point on a structure and methods of making such measurements which overcome the problems associated with prior art systems and measurement methods.

It is a further object of this invention to identify and formulate a technique for the measurement of the magnitude and direction of structural wave power flow in beams and plates which can be used outside the laboratory environment.

The invention provides in one form a structural wave intensity measuring system which is capable of use on site ie readings are directly available for interpretation without recourse to some remote data processing facility.

The system comprises a vibration sensing and measuring device comprising measuring means for producing electrical signals representing accelerations corresponding to at least two different vibrational modes on the surface of a structure and signal processing means to process said electrical signals, wherein the signal processing means includes:

(a) means to provide frequency conversion of the said electrical signals from their original frequencies to a band based at zero frequency;

(b) means to provide a $\pi/2$ radians phase shift to at least one of the said electrical signals; and (c) means to multiply each of the said electrical signals with one of the said electrical signals in phase quadrature to it to give a time-averaged power output signal of the vibration transmitted through the structure.

The system examines the intensity of the power flow rather than the vibrational amplitudes, and is capable of distinguishing between stationary resonances and net power flow.

Preferably time domain signal processing is used as this is the most suitable for portable real-time measuring system.

Advantageously the signals derived from the measuring means represent at least two different rotational acceleration signals and at least one translational acceleration signal.

Preferably the measured signals are processed using sum and difference amplifiers to achieve the desired acceleration signals.

Advantageously the input signals to the intensity meter are examined in pairs, conveniently a rotational acceleration signal and a lateral translational acceleration signal. Thus, for first each pair of input signals to the intensity meter, the two signals are converted to a zero-based frequency band and then one of the signals is phase shifted by the $\pi/2$ radians and multiplied by the other signal to give the time-averaged power output signal.

Preferably the frequency conversion is achieved by mixing each incoming signal (of frequency $f_s$) in a modulator with a signal from a local oscillator (of frequency $f_o$). The signals produced are the sum and difference products with frequencies of $(f_o+f_s)$ and $(f_o-f_3)$. Conveniently the local oscillator frequency is selected so that the difference frequency terms fall within the passband of a fixed filter to which the modulator output is connected.

The arrangement may advantageously be repeated for a plurality of input channels using the same oscillator signal. Preferably the frequency of the oscillator signal is variable and thus only one set of fixed filters is required to implement a tunable system, as tuning is achieved by varying the oscillator frequency so that the difference term $(f_o-f_s)$ always falls within the passboard of the filter. Thus the problems of design and construction experienced with prior art systems are greatly reduced. In addition the effective filter bandwidth is independent of the input signal frequency.

One possible problem associated with this arrangement is that the presence of image frequencies would require a further set of input filters to prevent them corruption of the signal at the modulator. However, if the oscillator frequency is selected to be the same as the input signal frequency, ie $f_o=f_s$ then no image frequencies will be produced.

The filters are preferably low-pass. If the cut-off frequency is $f_c$ then the measurement bandwidth will be $2f_c$. Because of the low frequencies involved a steep attenuation characteristic is possible with a relatively simple filter design, thus easing the phase matching problems. Conveniently the system is made DC coupled.

Advantageously the modulator should perform a simple multiplication of the two signal inputs so as to produce only the sum and difference products. A modulator which produces the sum and difference products of the two input frequencies is often referred to as a balanced modulator, since neither of the input signals appears in the output.

Preferably the local oscillator signal is sinusoidal and free from any harmonics or other spurious components.

Advantageously the modulators have: a wide bandwith, so that phase shifts due to the roll-off of performance at high frequency is negligible at the operating frequency; minimal signal feed-through that is, the output is zero if either of the inputs is set to zero which ensures that no low frequency transducer signals reach the filters; and good DC stability so that no off-set voltage is passed through the system to give false readings.

Advantageously the phase shift is applied to the local oscillator signal used for one of the modulators. Phase shifting a band of frequencies is difficult since a network with a phase shift of $\pi/2$ radians over a limited frequency band requires additional filtering to limit the frequency range of the input signals. If, however, the phase shift is applied to the local oscillator signal the phase shift network operates only at the defined oscillator frequencies and so requires no filtering. The phase shift in the oscillator signal is passed on to the modulator products and thus the system may be implemented with a minimum of frequency dependent component. Preferably the phase shifting is achieved by splitting the signal from a conventional oscillator into two outputs in quadrature.

Because the zero base frequency arrangement of the measuring system yields a constant measurement bandwidth which is independent of frequency it is advantageous for the oscillator tuning to have good frequency resolution, preferably with a linear control law.

The performance of the local oscillator unit is critical. Conveniently it should be tunable over the desired frequency range with fine incremental resolution. Advantageously, the phase difference between the outputs should be substantially 90° over the required frequency range, preferably within ±0.1° and the amplitude of both outputs should be essentially constant.

The filters removing the sum terms from the modulator outputs have a controlling influence on the performance of the measuring system, with the most critical parameter being the relative phase matching between channels. The cut-off frequency of these filters determines the measurement bandwidth of the whole system. A value of about 10 Hz has been found satisfactory.

The limit of the frequency range of the phase tolerance (about 0.1°) up to the −20 dB attenuation point is adequate since the effect of increasing the phase difference between the channels above this point is not significant due to the high attenuation of the signals.

Preferably the means to multiply the two output signals together to give a time-averaged power output signal comprises a multiplier-averager unit. Since only very low frequencies are involved the poor high frequency performance of this device is not important.

In order to obtain the time averaged value of the multiplication result it is preferable that a low pass filter is used, so as to avoid the problems associated with true integration. Conveniently a very low cut-off frequency is chosen, the specification being such as to give acceptable rise time and overshoot value while minimising ripple in the output. It is not necessary for the filters in the two multiplier-averager unit channels to be phase-matched in any way.

In another form the invention provides measurement methods for use with the structural wave intensity measuring system.

The measurement methods were devised to overcome the problem of the prior art methods. The measurement methods comprise:

a. a one dimensional narrow band measurement method using two-degree-of-freedom accelerometers;

b. a one dimensional finite difference method using two linear transducers;

c. a two dimensional narrow band measurement method using three-degree-of-freedom accelerometers; and d. a two dimensional finite difference method using four linear transducers.

The design criteria for a measurement method are that it must have basic accuracy, low sensitivity to experimental tolerances, generality of application, suitability for use with portable electronic equipment and, good dynamic range.

The one dimensional narrow band power flow measurement technique using two-degree-of-freedom accelerometers uses the idea that at a distance from discontinuities and the influence of their decaying wavefields, the shear force and bending moment components of the powerflow in a beam are equal in magnitude. Hence, in such circumstances, it is possible to calculate the time averaged value of the total power flow from the measurement of just one component.

Preferably this method comprises the use of one or more accelerometers that are capable of providing signals which are proportional to the lateral acceleration and the rotational acceleration at a point on a beam.

Preferably one of two types of transducer is used; either a biaxial two-degree-of-freedom accelerometer or a differencing two-degree-of-freedom accelerometer. A two-degree-of-freedom accelerometer is a device which provides output signals proportional to the transverse acceleration and the rotational acceleration. It is possible to employ a biaxial accelerometer as a two-degree-of-freedom accelerometer but not all types of two-degree-of-freedom accelerometers are biaxial.

A biaxial two-degree-of-freedom accelerometer conveniently consists of two linear accelerometers mounted on adjacent faces of a block, which is preferably made of a light, stiff metal and is attached rigidly to the surface of the structure. The accelerometer on the top surface of the block gives the lateral acceleration signal directly and the accelerometer mounted on a side face gives an output proportional to the rotation at the point of attachment. In addition, to these signals, this type of accelerometer produces unwanted signal components due to the cross-axis excitation of the linear accelerometers.

A differencing two-degree-of-freedom accelerometer arrangement is intended to minimise the effects of the cross-sensitivity of the linear accelerometers, though this may be at the expenses of a large physical construction. The arrangement preferably comprises two linear accelerometers attached to the ends of a rigid "T" shaped lever system. Preferably the base of the "T" is rigidly attached to a beamlike structure with its arms parallel to the axis of the beam. Preferably the lateral and rotational signals required are obtained by summing and differencing the two outputs. The cross-sensitivity terms of the two accelerometers excited by the transverse component of the rotational motion are negligible in the frequency ranges which are of interest.

Unlike the biaxial accelerometer implementation, phase errors in the quadrature operation and phase errors due to the accelerometers and associated signal conditioning channels cannot be considered equivalent. In the biaxial system these two types of phase error may simply be added before evaluating the effect. With the differencing accelerometer implementation these must be considered separately.

The two-degree-of-freedom accelerometer method can be implemented electronically fairly easily. If biaxial accelerometers are used the dynamic range is poor due to cross-sensitivity problems and is therefore unsuitable for use in most applications. However, if differencing accelerometers are used an acceptable dynamic range can be achieved, though care must be taken with the mechanical design to avoid resonances which would lead to phase shifts.

The linear transducer method preferably uses simple finite difference approximations with the formulation of the two-degrees-of-freedom method, as this method shows that the required signals may be obtained by the application of finite difference approximations to signals from two linear acelerometers placed a small distance apart. An attractive feature of this approach is that it may easily be applied to other types of transducer such as those which provide signals proportional to lateral velocity or displacement. The measurement errors introduced by the finite difference approximation can conveniently be removed using derived corrections.

The behaviour of this method is similar to that of the two-degree-of-freedom method except for the dynamic range. The dynamic range is controlled by two possible sources of error: the transducer phase errors and the quadrature function phase errors. As the sum and difference method greatly reduces the quadrature phase error, good dynamic range can be achieved provided relatively large values of transducer spacing are used. This also helps to minimize the spurious responses due to the dominating instrumentation relative channel tolerance. This method is the most generally useful one dimensional power flow measurement technique though care must be taken to keep the relative phase errors low, particularly in the transducers.

A two dimensional method limited to narrow bandwidth measurements of the intensities associated with plane waves was devised which is preferably based on the use of three-degree-of-freedom accelerometers. Such accelerometers provide signals proportional to the lateral acceleration and to the rotational acceleration in two orthogonal directions and thus provide a measurement of the total intensity at a point on structure. This method is analagous to the one dimensional method using two-degree-of-freedom accelerometers.

The application of simple finite difference approximations to the three-degree-of-freedom accelerometer method gives a technique employing an array of four linear accelerometers. Conveniently expressions can also be derived for making two dimensional measurements with velocity or displacement transducers. This method is analagous to the one dimensional linear transducer method, however an exact correction for the finite difference approximation cannot be obtained since the error varies with incident wave direction. This does not cause any problems in practice though, as an approximate correction can be made with an accuracy within the practical operational errors. This method is thus the most useful two dimensional power flow measurement technique.

Preferably the signals from the transducers are processed to provide a lateral acceleration signal and two rotational acceleration signals.

The preferred method of implementing the structural wave intensity measuring system uses the finite difference transducer measurement methods as these have been found to give the best results. This method of implementation for one and two dimensional measurements offers many potential advantages over the other methods, such as:

i. good dynamic range: this is the most important characteristic of any intensity measuring technique. When this method is implemented in the sum/difference form it offers the best dynamic range;

ii. flexibility: the spacing of the transducers can be varied which allows optimum results to be achieved in any given circumstances. Also, the transducers are easily interchanged, allowing some estimation of their contribution to measurement errors to be made;

iii. good immunity to instrumentation tolerances: the sensitivity to instrumentation gain and transducer spacing tolerances and the effect of phase errors on the travelling wave results is small;

iv. it allows a choice of transducers: either conventional accelerometers or velocity or displacement transducer arrangements may be used to suit the structure and frequency range of interest;

v. ease of use: only four transducers are required to allow implementation of the two dimensional method, and only two of them need be used for the use dimensional method. The transducers need not be attached to the structure at a fixed spacing but may be attached with an approximate spacing which may be measured precisely afterwards, provided only, in the case of the two dimensional measurements, a line drawn between one pair of the transducers is at right angles to a line between the other pair; and vi. it has extension to other applications: the electronic system, when implementing this method, can also be used for differencing accelerometer, biaxial accelerometer and triaxial accelerometer, one and two dimensional measurements without modification or extensive signal path switching.

The main disadvantage of this method is that it is only strictly valid far from the decaying near-field waves caused by dicontinuities in the structure under test. However, this limitation is not severe and as moderate errors can generally be tolerated, measurements are possible to within about $\lambda/10$ of a wavelength from a discontinuity.

Preferably the signals from the transducers are passed through sum and difference amplifier units to give signals in terms of lateral and rotational acceleration signals for input to the electronic intensity measuring system. Preferably each amplifier unit is switchable in function and has variable gain in switched increments. Conveniently the gains are adjusted so that the intensity meter circuits are presented with the largest possible signals consistant with any overload conditions of the circuits.

Preferably there is included a means of measuring the peak signal levels at the inputs of the modulators so as to enable the gains of the sum/difference amplifiers to be set quickly. As moving coil meter ballistics cause problems, a light emitting diode (LED) peak level meter is conveniently used. Successive LED's are arranged to illuminate as the input voltage rises even with random signals.

It is advantageous to limit the measurement bandwidth because, in practical structures, it is probable that there will be significant power transmissions at certain frequencies and essentially stationary wave motion at other frequencies. Preferably, therefore, the measurement bandwidth is reduced to limit the input signals to a small frequency band of interest, thus reducing the dynamic range problem, as unwanted stationary wave signals are filtered out.

Advantageously the time-averaged power results are multiplied by a correction factor to overcome systematic errors due to the positioning of the transducers.

Preferably each transducer is attached, separately, directly onto the structure or, in the case of biaxial, triaxial transducers etc, each unit is attached directly.

Preferably the system is operated on a structure under normal running conditions and an induced signal is not required. In certain circumstances an induced signal may be desirable and so can be used instead.

An average of the system of the invention is that the number of filters is reduced compared to any prior art system, thus reducing the matching problems and the invention provides a simple analogue method of avoiding many of the problems.

In order that the invention may be more fully understood, one embodiment thereof will now be described by way of example only, with reference to the accompanying drawings, to which:

Figure 1:
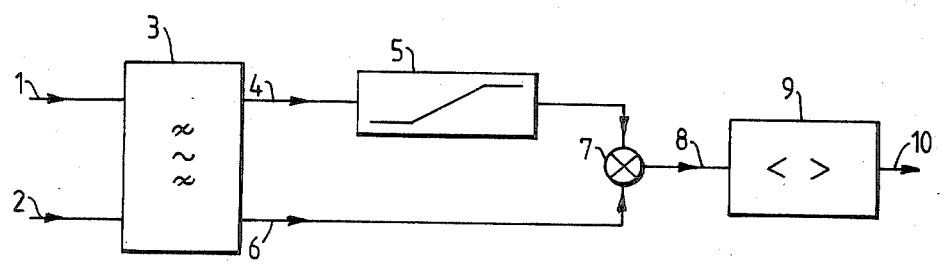
FIG. 1 is a circuit block diagram illustrating the basic operation of prior art vibration power flow measuring systems.
Figure 2:
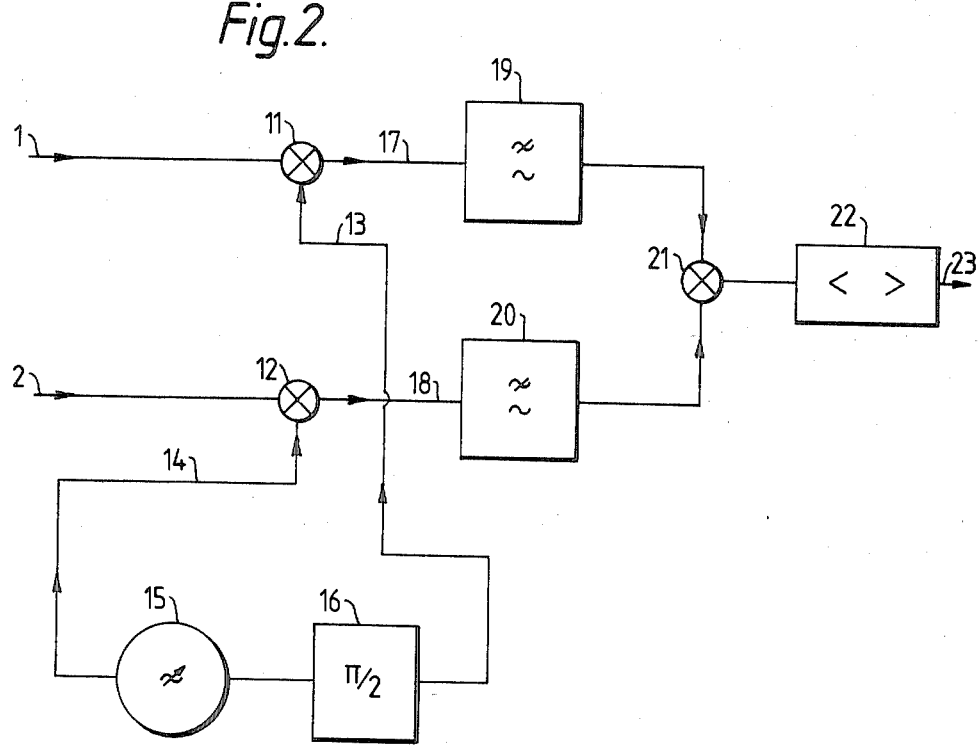
FIG. 2 is a circuit block diagram illustrating the basic operation of a structural wave intensity meter of the invention.

FIGS. 1 and 2 illustrate the major differences between prior art systems and the system of the invention. In the prior art systems as shown in FIG. 1, inputs 1 and 2, of electrical signals representing two different acceleration modes measured on the surface of a structure under test, are passed through a band-pass filter 3, which may be either a switched bank of filters or tunable band-pass filters. The input signal 1 is filtered by the band-pass filter 3 to give an output signal 4 which is integrated by an integrator 5 and then connected to a multiplier 7 where it is multiplied by the filtered output signal 6 from the second input 2. The multiplier output 8 is passed through a time-averager unit 9 to give a time-averaged power output 10.

The operation of the system of the invention can be seen by reference to FIG. 2. Inputs 1 and 2 are multiplied, in multipliers 11 and 12, by spectrally pure sinusoidal signals 13 and 14 derived from a variable frequency oscillator 15. The signal 13 is phase shifted by 90° relative to signal 14 in a phase shifter 16. The two multiplier output signals 17 and 18 are passed through low-pass filters 19 and 20, multiplied together in a multiplier 21 and time-averaged by a time-averager unnit 22 to give the time-averaged power output 23.

The system of FIG. 2 is an alternative version of FIG. 1 arrangement but giving greater simplicity and accuracy and being more easily implemented.

Figure 3:
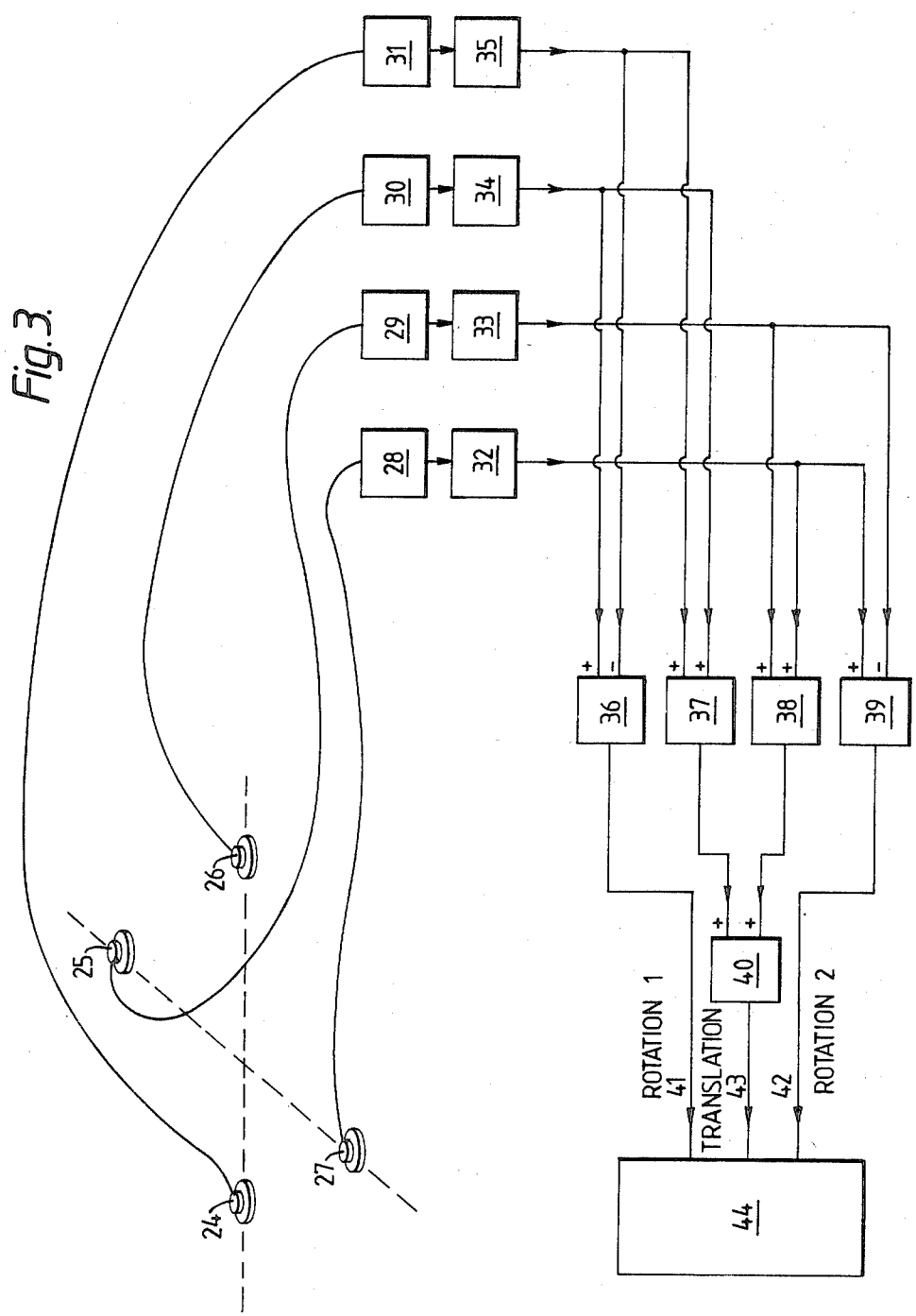
FIG. 3 is a block diagram showing the structural wave intensity meter of FIG. 2 and measurement transducers arranged for taking intensity measurements on a structure.

The arrangement of the structural wave intensity meter and the measurement transducers for two dimensional measurements is shown in FIG. 3. Four accelerometers 24, 25, 26, 27 are arranged on the surface of a structure such that the line between accelerometers 24 and 26 is perpendicular to the line between accelerometers 25 and 27. The charge generated by each accelerometer is converted to a voltage signal by charge amplifiers 28, 29, 30 and 31. These signals are further amplified by DC coupled voltage amplifiers 32, 33, 34 and 35. The amplified signals are then passed through sum/difference amplifiers 36, 37, 38, 39, 40 to give two rotational acceleration signals 41 (ROTATION (1)) and 42 (ROTATIO (2)) and a lateral translational acceleration signal 43 (TRANSLATION). Signals 41, 42, 43 are then connected to the input to an intensity meter 44 for processing to give them averaged power measurements.

Figure 4:
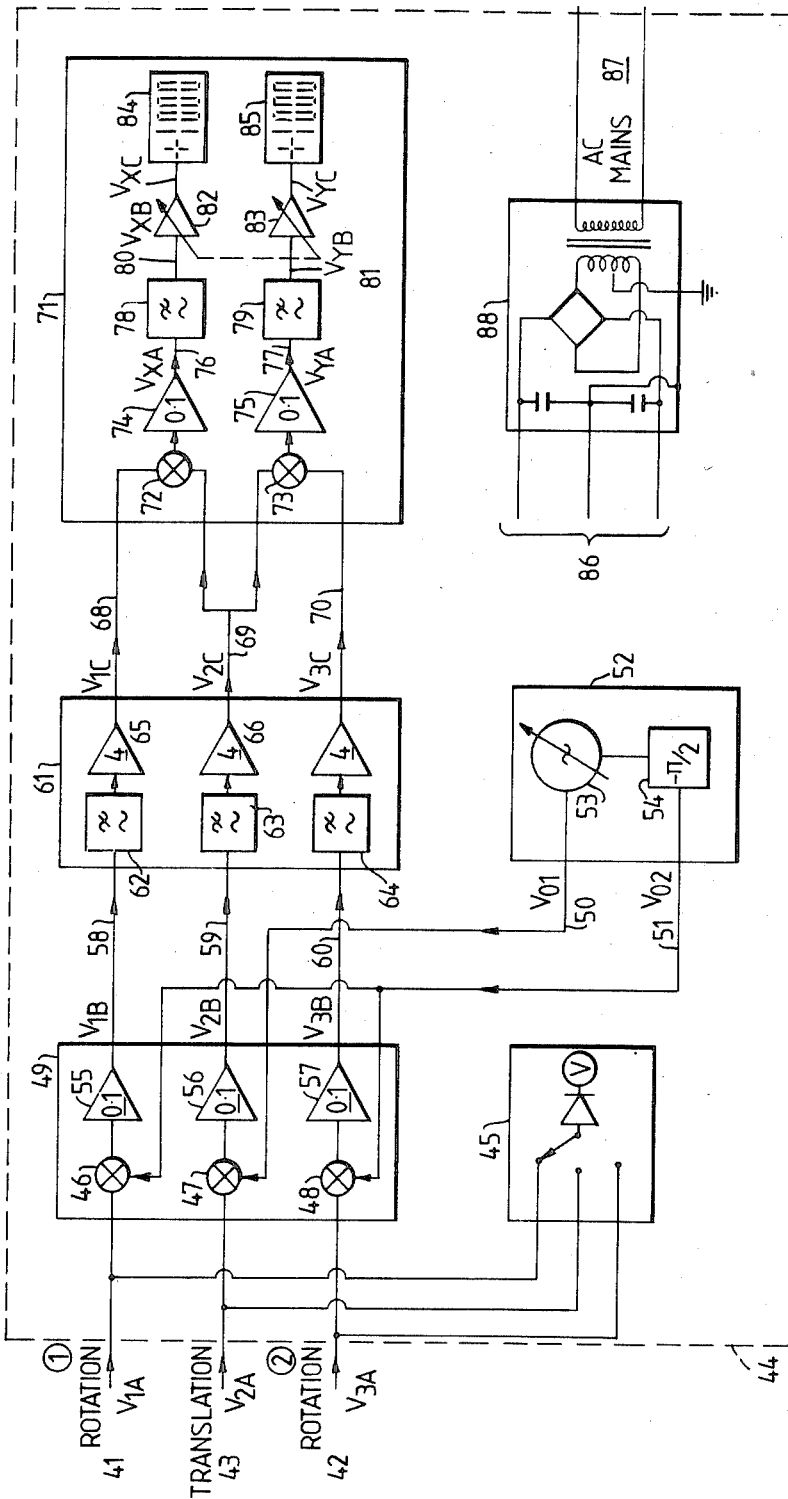
FIG. 4 is a circuit block diagram of a structural wave intensity meter shown in FIG. 3.

Referring now to FIG. 4, the configuration of the structural wave intensity meter 44 is shown. A peak level indicator 45 is used to selectably measure the peak levels of the input signals 41, 42, 43 so that system overloading may be avoided. The signals 41, 42, 43 are passed into linear modulators 46, 47, 48 in a modulator unit 49 where they are multiplied by spectrally pure sinusoidal signals 50, 51 from a local oscillator unit 52. Signals 50 and 51 are derived from a variable oscillator circuit 53 with signal 51 being delayed by a $\pi/2$ shifter 54. The sinusoidal signal 50 is connected to the translational signal (43) modulator 47 while the $\pi/2$ phase shifted signal 51 is connected to the rotational signal (41, 42) modulators, 46, 48. The output signals from the modulators 46, 47, 48 are passed through amplifiers, 55, 56, 57, also in the modulator unit 49, which have gains of 0.1 so as to limit the required output voltage swing. The outputs 58, 59, 60 of the modulator unit 49 are passed into a filter unit 61. Each signal 58, 59, 600 is passed through a respective low pass filters 62, 63, 64 which removes the "sum" terms from the signals 58, 59, 60, leaving only the "difference" terms. The output signals from the filters 62, 63, 64 are then amplified by amplifiers 65, 66, 67, which each have a gain of 4. The filter unit (61) output signals 68, 69,70 are passed to a multiplier-averager unit 71 where signals 68 and 69 are multiplied together in an analogue multiplier 72 and similarly signals 69 and 70 are multiplied in a multiplier 73. The outputs of multipliers 72 and 73 are passed through amplifiers 74 and 75, each of which has a gain of 0.1, to give output signals 76, 77. The DC components of the signals 76, 77 are proportional to the time-averaged power flow. The time varying component is removed by passing signals 76 and 77 through very sharp, very low frequency cut-off low-pass filters 78 and 79. The filtered signals at outputs 80, 81 are amplified by amplifiers 82, 83 and then displayed digitally on displays 84, 85. The gain of amplifiers 82, 83 is varied to give the most convenient display of the results.

An unregulated low voltage supply 86, derived from the AC Mains 87 through a rectifier circuit 88, is used to power all the units.

For a structural wave intensity measuring system as shown in FIG. 4 the system equations can be derived as follows:

For the general one dimensional measurement case of a travelling wave in a uniform beam, with angular frequency $w_s$, the lateral displacement $$W(x,t) = A \sin(w_s t - kx) \tag{1}$$

(where A is the amplitude coefficient, k is the wave number and x and t are the functions of distance and time respectively) then the lateral and rotational accelerations, obtained by sum and difference methods, will be $$\frac{d^2W}{dt^2} = -w_s^2 A \sin(w_s t - kx) = V_{2A} \tag{2}$$

$$\frac{d^3W}{dxdt^2} = kw_s^2 A \cos(w_s t - kx) = V_{1A} \tag{3}$$

Where $V_{2A}$ is the TRANSLATION input 43 to the measuring system 44 and $V_{1A}$ is the ROTATION (1) input 41. The equations for $V_{3A}$, the ROTATION (2) input 42, are the same as for $V_{1A}$ and will not be repeated.

The constant phase terms kx in equations 2 and 3 may be neglected as they are identical for both signals.

The outputs 58 ($V_{1B}$) and 59 ($V_{2B}$) of the modulator unit 49 are given by:

$$V_{1B} = V_{1A} \cdot V_{02}/10 \tag{4}$$

$$= \frac{1}{10}[kw_s^2 A \cos(w_s t) \cdot 5 \sin(w_o t)]$$

$$= \frac{kw_s^2 A}{4}[\sin((w_o - w_s)t) + \sin((w_o + w_s)t)]$$

and $$V_{2B} = V_{2A} \cdot V_{02}/10 \tag{5}$$

$$= \frac{1}{10}[-w_s^2 A \sin(w_s t) \cdot 5 \cos(w_o t)]$$

$$= \frac{-w_s^2 A}{4}[\sin((w_s - w_o)t) + \sin((w_s + w_o)t)]$$

$V_{01}$ and $V_{02}$ are the local oscillator 52 "reference" and "quadrature" outputs 50 and 51 respectively, both having a peak amplitude of 5 volts and an angular frequency of $w_o$ which is close to, but not equal to $w_s$.

These signals 58, 59 are passed to the filter unit 61. Since $w_o$ is approximately equal to $w_s$ the frequency difference between the two products in each signal path will be large. The output signals from the filter unit will therefore have the sum terms filtered out and will contain only the difference terms ie $$V_{1C} = kw_s^2 A \sin((w_o - w_s)t) \tag{6}$$

$$V_{2C} = w_s^2 A \sin((w_o - w_s)t) \tag{7}$$

The filtered signals $V_{1C}$ and $V_{2C}$ are now multiplied together in the multiplier 72 and scaled by a factor of 0.1 in the amplifier 74 to give $V_{XA}$ (76) where:

$$V_{XA} = V_{1C} \cdot V_{2C}/10 \tag{8}$$

$$= \frac{1}{10}[kw_s^2 A \sin((w_o - w_s)t) \cdot w_s^2 A \sin((w_o - w_s)t)]$$

$$= kw_s^4 A^2/20 [1 - ((2w_o - 2w_s)t)]$$

The signal $V_{XA}$ is then filtered by the filter 78 to remove the time varying term giving an output $V_{XB}$ (80) where:

$$V_{XB} = \frac{K w_s^4 A^2}{2} \tag{9}$$

This is amplified by the amplifier 82 to give an output $V_{XC}$ where:

$$V_{XC} = 2kw_s^4 A^2 \tag{10}$$

The absolute value of power flow, scaled by the physical parameters of the structure under test and by the frequency, is given by $$<p> = 2 \frac{(M_b EI)^{\frac{1}{2}}}{w_s^2} < \frac{d^3 w}{dxdt^2} \cdot \frac{d^2 w(q)}{dt^2} > \tag{11}$$

Where $<p>$ is the time averaged value of the total power flow, P, $M_b$ is the mass per unit length of the beam, E is Young's modulus, I is the second moment of area of the cross-section of a beam and (q) denotes a quadrature function.

Thus the displayed result at display 84 is given by:

$$<p> = 2 \frac{(M_b EI)^{\frac{1}{2}}}{w_s^2} \cdot V_{XC}$$

The structural wave intensity measuring system of the invention can be used easily and it has good basic accuracy. It can be used to obtain intensity maps and from many measurements on the surface of a structure the value of obtaining frequency selective results has been shown.

Even a small change in measurement frequency shows significantly different patterns of power flow in the structure and significant differences in behaviour can be shown for apparently identical structures. It has been clearly shown in the past that broadband data is of limited value as there is a lack of correlation with well defined patterns of power flow.

The system has many advantages over prior art systems, the most important being:

a. the filters are fixed in frequency for all input frequencies, thus avoiding tunable or switched banks of filters;

b. the matching problems are much reduced; and c. the system can easily be tuned, simply by varying the oscillator.

In addition, the system can be implemented as an easily portable meter for use on site.

Some of the functions of the system could be replaced by digital circuits, for example the filters and the local oscillator unit. Non-resonant transducers may be used to help reduce transducer phase errors. Strain gauges are a possibility for use and, in the future. Laser Doppler velocity transducers and, possibly, optical intensity displacement transducers could perhaps be used.

With a suitable choice of transducers, torsional vibration power flow, compressive wave vibration power flow, and acoustic intensity may be measured using this instrument.

I claim:

1. A vibration sensing and measuring device comprising measuring means for producing electrical signals representing accelerations corresponding to at least two different vibrational modes on the surface of a structure and signal processing means to process said electrical signals, wherein the signal processing means includes:
   (a) means to provide frequency conversion of the said electrical signals from their original frequencies to a band based at zero frequency;
   (b) means to provide a $\pi/2$ radians phase shift to at least one of the said electrical signals; and
   (c) means to multiply each of the said electrical signals with one of the said electrical signals in phase quadrature to it to give a timeaveraged power output signal of the vibration transmitted through the structure.

2. A vibration sensing and measuring device according to claim 1 two different rotational acceleration signals and a translational acceleration signal.

3. A vibration sensing and measuring device according to claim 2 wherein the signals from the measuring means are connected to sum/difference amplifiers to give the acceleration signals.

4. A vibration sensing and measuring device according to claim 3 wherein the output signals from the measuring means are examined in pairs.

5. A vibration sensing and measuring device according to claim 1 wherein the means to provide frequency conversion comprises a variable local oscillator for providing a preselected frequency signal, modulators for mixing each respective measured electrical signal with the preselected frequency signal, and filter means to filter out the sum products of the modulator mixing.

6. A vibration sensing and measuring device according to claim 5 wherein the filter means comprises low pass filters with a cut-off frequency of 10 Hz.

7. A vibration sensing and measuring device according to claim 1 wherein the measured electrical signals are connected to respective modulators and preselected frequency output signals in phase quadrature are connected to the modulators so as to give the required pahse-quadratured electrical signal products.

8. A vibration sensing and measuring device according to claim 7 wherein the measuring means includes transducers whose output signals are processed by sum/difference amplifier units using finite difference approximations to produce the required accelerations.

9. A vibration sensing and measuring device according to claim 8 wherein the output signal from the transducers are connected to sum and difference amplifier units having an incrementally variable gain control.

10. A vibration sensing and measuring device according to claim 9 wherein there is included a means to measure the peak signal levels of the measured electrical signals connected to the inputs of the modulators such that the gains of the amplifiers can be set to a maximum within a predetermined overload condition.

11. A vibration sensing and measuring device according to claim 7 wherein the measuring means comprises four accelerometers for spaced-apart attachment in cruciform arrangement to the surface of a structure.

12. A vibration sensing and measuring device according to claim 11 wherein the signals from the accelerometers are processed in pairs by the sum/difference amplifiers to give two rotational and one translational acceleration signals.

13. A vibration sensing and measuring device according to claim 12 wherein the acceleration signals are frequency modulatored by a local oscillator of preselected frequency and then filtered by low-pass filters.

14. A vibration sensing and measuring device according to claim 13 wherein a $\pi/2$ phase shift is applied to each of the two rotational acceleration signals.

15. A vibration sensing and measuring device according to claim 14 wherein the translational acceleration signal is multiplied with the phase-quadratured rotational acceleration signals by multipliers.

16. A vibration sensing and measuring device according to claim 15 wherein the output signals from the multipliers are filtered by low pass filters and displayed on displays, the displayed signal being a time-averaged vibrational power flow reading.

17. A vibration sensing and measuring device according to claim 1 wherein the measuring means comprises four accelerometers for spaced-apart attachment in cruciform arrangement to the surface of a structure.

* * * * *